(12) United States Patent
Godecker et al.

(10) Patent No.: US 9,676,483 B2
(45) Date of Patent: Jun. 13, 2017

(54) AIRCRAFT GALLEY AIR CHILLER SYSTEM

(71) Applicant: B/E Aerospace, Inc., Wellington, FL (US)

(72) Inventors: William J. Godecker, Irvine, CA (US); Qiao Lu, Placentia, CA (US); Torsten Trumper, Hamburg (DE)

(73) Assignee: B/E Aerospace, Inc., Wellington, FL (US)

( * ) Notice: Subject to any disclaimer, the term of this patent is extended or adjusted under 35 U.S.C. 154(b) by 260 days.

(21) Appl. No.: 14/321,435

(22) Filed: Jul. 1, 2014

(65) Prior Publication Data

US 2015/0007600 A1    Jan. 8, 2015

Related U.S. Application Data

(60) Provisional application No. 61/842,805, filed on Jul. 3, 2013.

(51) Int. Cl.
| | |
|---|---|
| *F25B 27/00* | (2006.01) |
| *B64D 11/04* | (2006.01) |
| *F25B 29/00* | (2006.01) |
| *F25D 17/06* | (2006.01) |
| *F25D 19/00* | (2006.01) |
| *F25D 17/02* | (2006.01) |
| *B64D 13/06* | (2006.01) |

(52) U.S. Cl.
CPC ............ *B64D 11/04* (2013.01); *F25B 29/003* (2013.01); *F25D 17/02* (2013.01); *F25D 17/06* (2013.01); *F25D 19/00* (2013.01); *B64D 2013/0629* (2013.01); *F25B 2339/047* (2013.01); *F25D 2400/20* (2013.01); *Y02T 50/46* (2013.01)

(58) Field of Classification Search
CPC  B64D 11/04; B64D 2013/0629; B64D 13/06; F25D 17/02; F25D 17/06; F25D 19/00; F25D 2400/20
See application file for complete search history.

(56) References Cited

U.S. PATENT DOCUMENTS

| 9,238,398 B2* | 1/2016 | Lu ..................... B60H 1/00592 |
| 2003/0042361 A1* | 3/2003 | Simadiris ............... B64D 11/04 |
| | | 244/118.5 |
| 2007/0084226 A1 | 4/2007 | Simadiris et al. |

(Continued)

FOREIGN PATENT DOCUMENTS

EP    1902647 A1    3/2008

OTHER PUBLICATIONS

International Search Report, Sep. 9, 2014, 3 pages, from PCT/US2014/45279.

*Primary Examiner* — Elizabeth Martin
(74) *Attorney, Agent, or Firm* — Shumaker, Loop & Kendrick, LLP (57) ABSTRACT

A chiller for an aircraft galley that is sized to be disposed in a compartment for housing beverage carts, the chiller comprising a vapor cycle refrigeration system with a liquid cooled condenser located within the housing and a liquid cooling unit located within the housing. Further, the vapor cycle refrigeration system and the liquid cooling unit have a combined footprint that is less than a footprint of a food and beverage cart within the housing, such that the space occupied by the chiller displaces no more than one beverage cart.

7 Claims, 7 Drawing Sheets

(56) References Cited

U.S. PATENT DOCUMENTS

2009/0107163 A1\* 4/2009 Lu .......................... F25D 17/06
  62/291
2010/0224726 A1\* 9/2010 Lu .......................... F25D 17/06
  244/118.5

\* cited by examiner

AIRCRAFT GALLEY AIR CHILLER SYSTEM

CROSS-REFERENCES TO RELATED APPLICATIONS

This application is based upon and claims priority from U.S. Provisional Application No. 61/842,805, filed Jul. 1, 2014, incorporated by reference in its entirety.

BACKGROUND

Large commercial passenger carrying airplanes predominantly employ one of two systems for keeping perishable food stuffs and non-perishable drinks at desired temperatures. Chilling is necessary to preserve perishables and make certain beverages and foods more palatable, especially during long haul and ultra-long haul aircraft journeys. The first method utilizes a standard vapor cycle based air chillers that utilize conventional refrigerant gas compression and expansion technology to generate a secondary re-circulated chilled air loop. The chilled air is generally supplied and returned via thermally insulated air ducting to and from a suitable storage structure, such as a galley. The air chiller may be located on or in the galley or mounted in part of the aircraft airframe.

The second method utilizes the same conventional refrigerant gas compression and expansion technology, but the cooling medium is a chilled liquid rather than a gas. This chilled liquid is pumped in a closed loop to and from a suitable storage structure such as a galley. The chilled liquid in some cases are configured as a large centralized system for the whole aircraft. In other cases, the chilled liquid can be circulated at each separate aircraft door galley complex to form a local area chilling loop, or be based on each individual galley as a standalone system. At the galley, the liquid is passed via a control valve and electronic control system to a heat exchanger, where an electric axial (or other) fan blows or sucks air through its matrix around enclosed areas of the storage structure that requires chilling, for example: a galley cart bay or compartment. The heat exchanger fan and its control system (though not necessarily all) are grouped together to form a chilled air recirculation unit that may be fitted in the galley or remotely spaced from it.

One drawback of these various chiller systems is that they take up a large percentage of available space in the galley, which is at a premium in an aircraft for obvious reasons. Further, the chillers tend to be very heavy, which is also a drawback to their use on aircraft. There are also issues with condensation collection and removal, and the need for improvements in heat transfer efficiency. Accordingly, it would be beneficial to have a chiller system that takes up less space and reflects a reduction in weight over conventional chiller systems currently in use, while providing for condensation collection and improved heat transfer efficiency.

SUMMARY OF THE INVENTION

The present invention is an aircraft chilled air distribution system with a reduced overall foot print and reduced weight, and with an improved overall heat transfer efficiency. This compact system is particularly well suited for an aircraft galley that requires refrigerated or cooled carts or trolleys, and/or carts carrying standard meal boxes, and/or chilled food and beverage compartments. The chiller system of the present invention uses a cooling unit adjacent the beverage carts and below the work deck of the aircraft galley, which includes ducting leading away from the beverage cart storage to carry away heated air during the cooling process. The chiller comprises a housing with a plurality of fans located preferably along an upper surface for drawing air into the unit to be introduced into a vapor cycle. The vapor cycle includes an evaporator, an expansion valve, a liquid cooled condenser, and a compressor, all arranged in a compact arrangement. The cooled air is forced through a chilled air vent into the beverage cart compartment, thereby chilling the beverage carts and other storage compartments with perishables. A display may be provided on the unit for controlling the temperature and other operations of the unit.

The location of the invention plays a useful role in both the galley foot print and weight reduction, as well as the efficient distribution of chilled air around the below work deck installed trolley or cart. The through work deck air path, ductwork and air guiding devices are positioned for the efficient use of the chilled air to meet the certification requirements of the aircraft manufacturers.

Other features and advantages of the present invention will become more apparent from the following detailed description of the preferred embodiments in conjunction with the accompanying drawings, which illustrate by way of example the operation of the invention

DETAILED DESCRIPTION OF THE PREFERRED EMBODIMENTS

Figure 1:
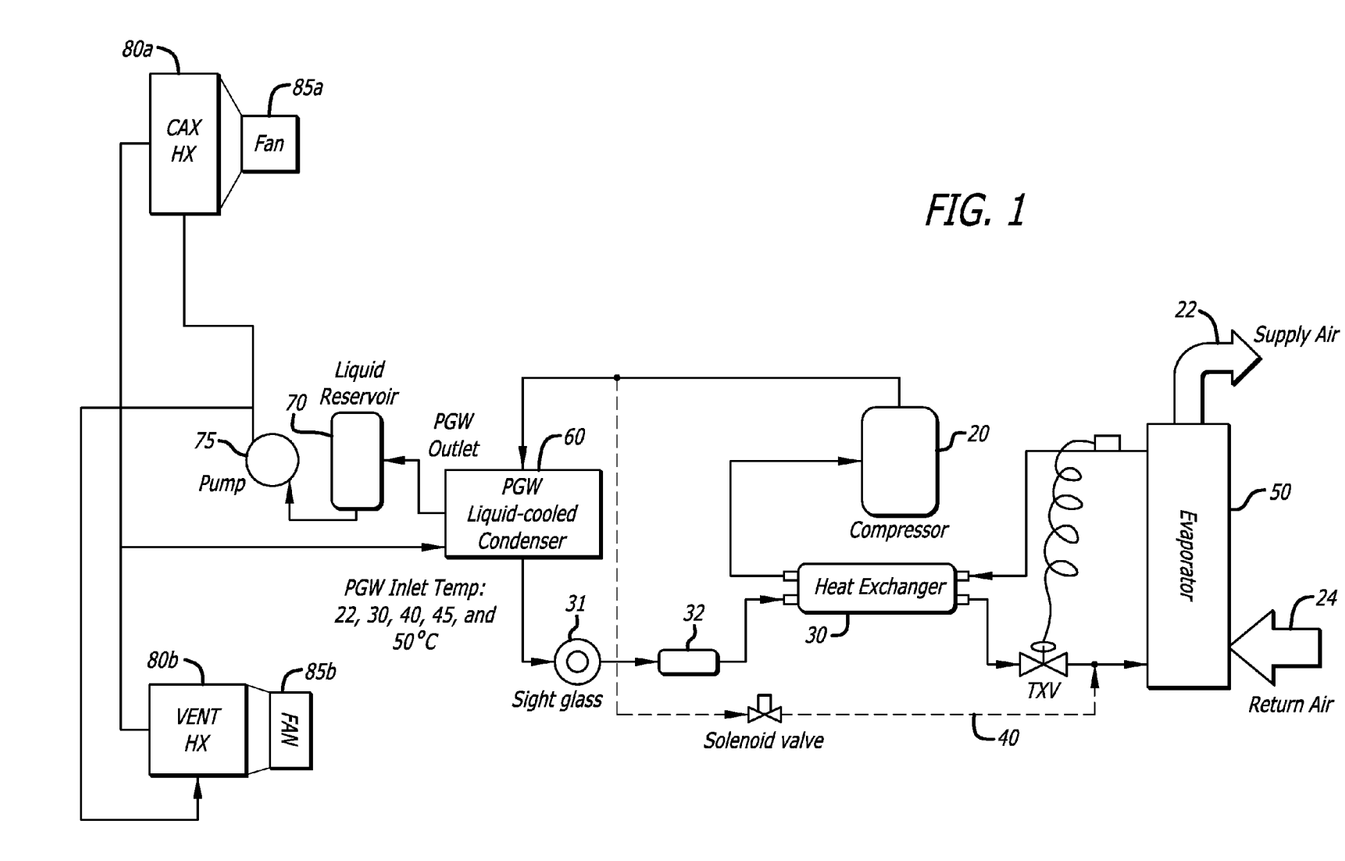
FIG. 1 is a schematic of a refrigeration system using the chiller of the present invention.

FIG. 1 illustrates a schematic of a new liquid cooled refrigeration system that is particularly suited for the galley of a commercial aircraft, as set forth below. The system incorporates the basics of a vapor cycle refrigeration system, including a compressor 20, a heat exchanger 30, a refrigerant sight glass 31, a refrigerant filter and dryer 32, a thermo-expansion valve ("TXV") 40, and an evaporator 50. Cooled "supply" air 22 is delivered by the evaporator 50 as part of the evaporation process, as ambient air 24 is drawn into the evaporator 50. A liquid cooling system is employed circulating a coolant such as polyethylene glycol water ("PGW"), which passes through a liquid cooled condenser 60 and into a liquid reservoir 70 where it is collected. The coolant is then pumped via a liquid pump 75 to a pair of heat exchangers 80a, 80b, where fans 85a, 85b cool the coolant.

The chilled coolant is then returned to the condenser 60 to cool the refrigerant from the compressor 20.

For illustration purposes, a chiller system was constructed using the present invention having the following characteristics.

EXAMPLE 1

Liquid-Cooled Point of Use Chiller
Cooling capacity: 700 W (Ground case), and 300-400 W (In flight case)
Coolant: PGW (60/40)
Electronic controller with display panel.
Liquid Pump and Reservoir Assembly:
Liquid pump: 4 l/m with 50 Psi. pressure rise
Reservoir: Aluminum light weight design
Heat Exchanger 1
Located in aircraft CAX air system,
Maximum airflow: 40 l/s
Inlet temperature: 22° C. (in flight), and 29° C. (Ground, worst case)
Max. outlet air temperature: 70° C.
Heat Exchanger 2
Located in aircraft floor heater area,
Maximum airflow: 100 l/s
Inlet temperature: 22° C. (in flight), and 29° C. (Ground, worst case)
Max. outlet air temperature: 25° C. (to thermal comfort zone), 70° C. (to lower level)

Figure 2:
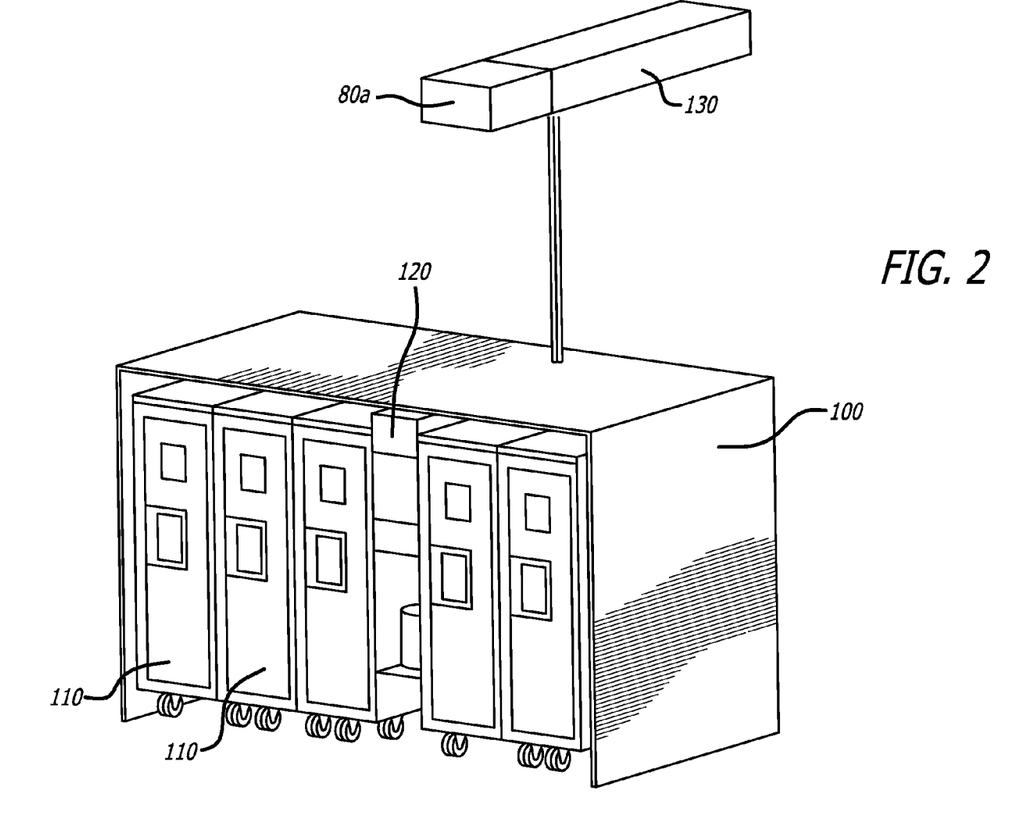
FIG. 2 is an elevated perspective view of the galley cart storage area with the front wall removed, illustrating the position of the chiller within the compartment and the air ducting leading away from the cart compartment.

FIG. 2 illustrates a galley cart compartment 100 filled with beverage/serving carts 110 used in food and beverage service for an aircraft. The carts 110 are arranged side-by-side in the galley cart compartment 100, which is traditionally cooled by a unit located in another part of the aircraft that uses ducting to bring cooled air to the compartment. In the present invention, a point of use ("POU") air chiller unit 120 is located inside the cart compartment 100 to more effectively chill the compartment with less heat losses and better efficiency. The chiller unit 120 can be located inside the cart compartment 100 because it is designed to have a footprint and spatial characteristics that make it fit within the compartment between two beverage carts. The compartment includes CAX air ducting 130 to carry away heated air, and a heat exchanger 80*a* utilizes the energy from the heated air to recover some of the thermodynamic losses.

Figure 3:
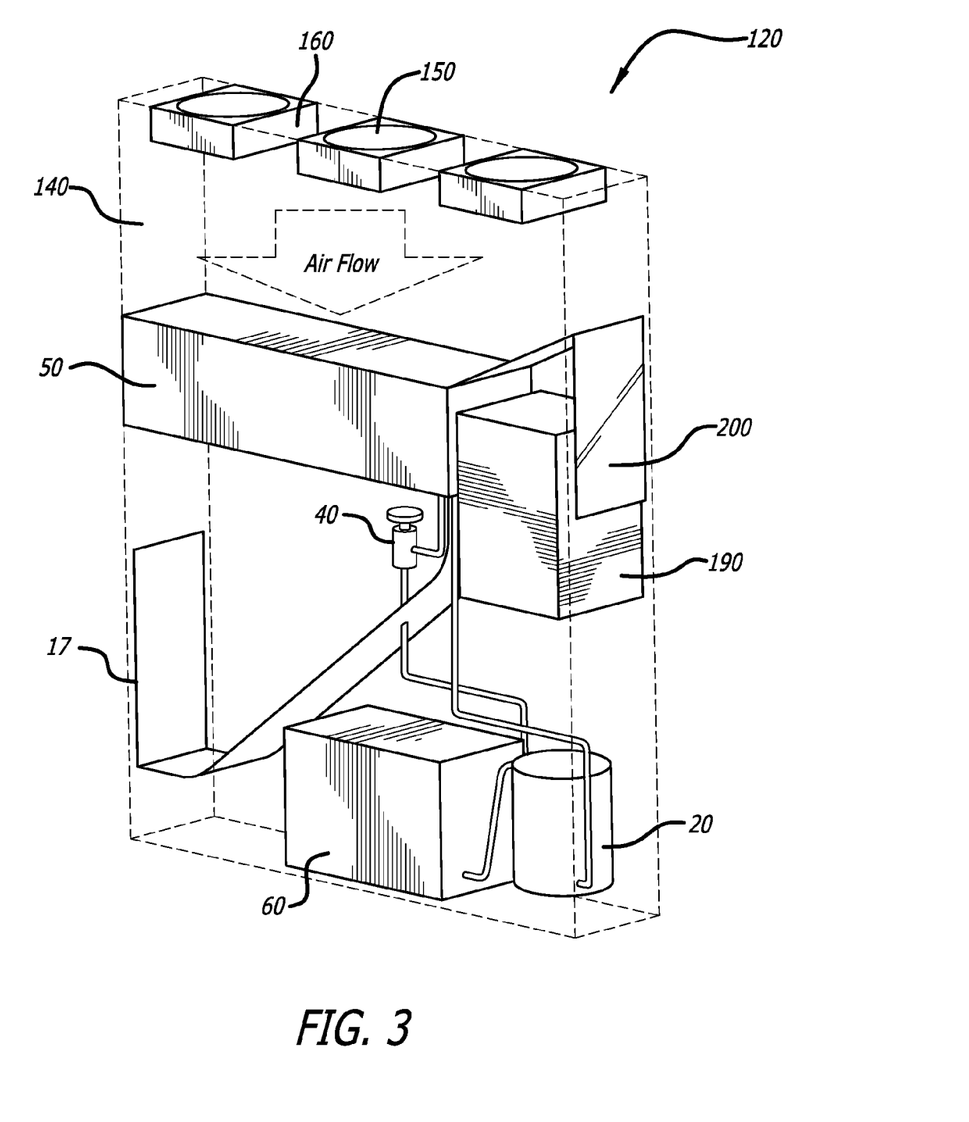
FIG. 3 is an elevated perspective view of the chiller unit, partially in shadow to illustrate the components and their positions.

FIG. 3 illustrates the chiller unit 120, which comprises a housing 140 having a plurality of fans 150 on the upper surface 160 for drawing air 24 into the chiller 120. At the same time, circulating refrigerant enters the compressor 20 in the thermodynamic state known as a saturated vapor and is compressed to a higher pressure, resulting in a higher temperature as well. The hot, compressed vapor is then in the thermodynamic state known as a superheated vapor and it is at a temperature and pressure at which it can be condensed with cooling coolant (e.g., PGW). This hot vapor is routed through the condenser 60 where it is cooled and condensed into a liquid by flowing through a coil or tubes with cool coolant flowing across the coil or tubes. This is where the circulating refrigerant releases heat from the system and the released heat is carried away by the coolant.

The condensed liquid refrigerant, in the thermodynamic state known as a saturated liquid, is next routed through an expansion valve 40 where it undergoes an abrupt reduction in pressure. That pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the temperature of the beverage cart compartment 100. The cold mixture is then routed through the coil or tubes in the evaporator 50. A fan circulates the warm air in the enclosed space across the coil or tubes carrying the cold refrigerant liquid and vapor mixture. That warm air evaporates the liquid part of the cold refrigerant mixture. At the same time, the circulating air is cooled and passed through the chilled air outlet 175, thereby lowering the temperature of the beverage cart compartment 100 to the desired temperature. The evaporator 50 is where the circulating refrigerant absorbs and removes heat which is subsequently rejected in the condenser 60 and transferred elsewhere by the coolant used in the condenser 60. To complete the refrigeration cycle, the refrigerant vapor from the evaporator 50 is again a saturated vapor and is routed back into the compressor 20. An electronic controller 190 is interconnected to each component of the system, and regulates and oversees the operation of the system. A user interface is manipulated by a control panel 200, which includes a display for exhibiting the conditions and output of the system.

Figure 4:
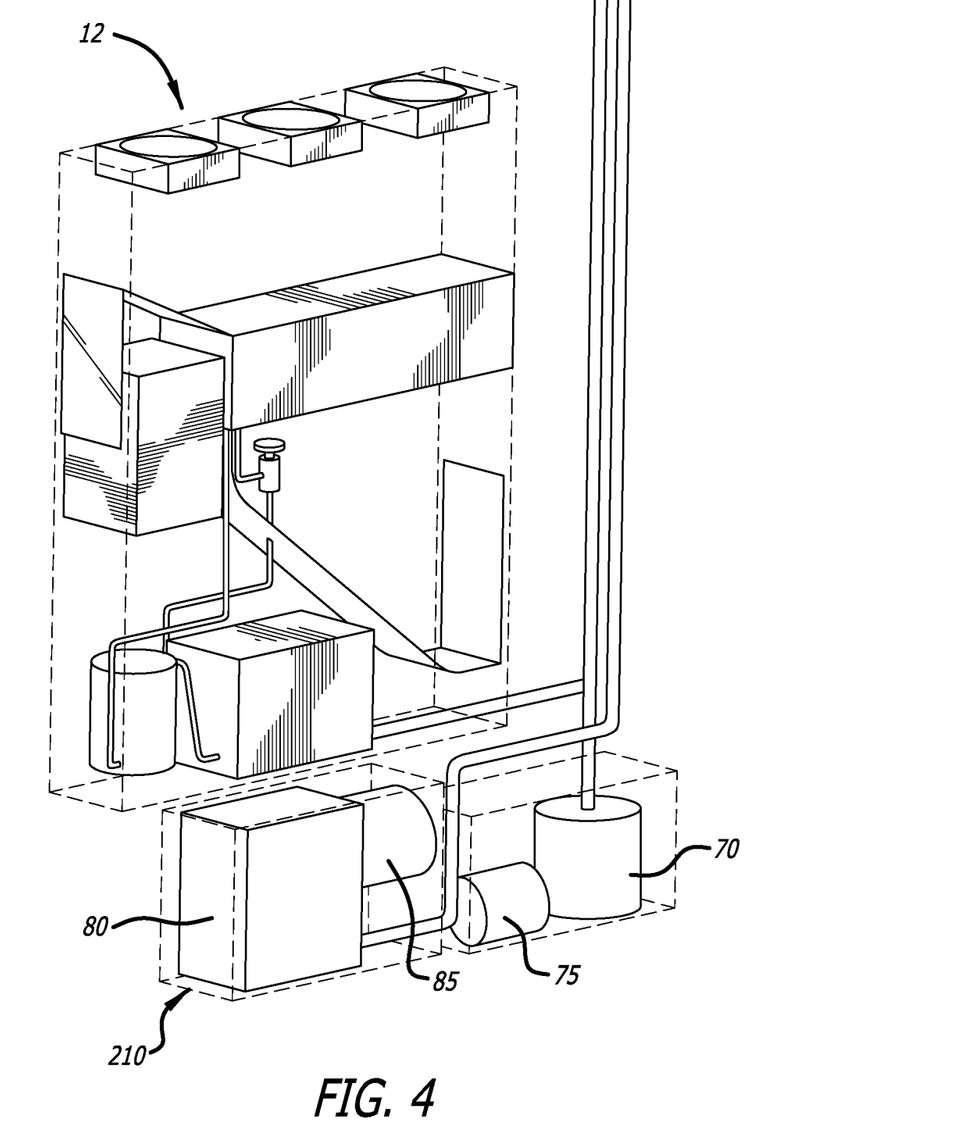
FIG. 4 is an elevated perspective view of the chiller unit and the liquid cooling unit, partially in shadow to show the components and their positions.

FIG. 4 illustrates a liquid cooling unit 210 that is positioned below the chiller unit 120 within the cart compartment 100. The liquid cooling unit 210 includes a liquid reservoir 70, a liquid pump 75, a heat exchanger 80*b* and a fan 85*b*. By placing this unit inside the beverage cart compartment 100, a more efficient system is derived with less losses due to extended or unnecessary ducting between operational components. The heat exchanger 80*b* removes the heat from warm coolant, and discharge the warm air, through fan 80*b*, to the floor of the aircraft. This heat may be recovered for reducing the usage of aircraft floor heaters.

Figure 5:
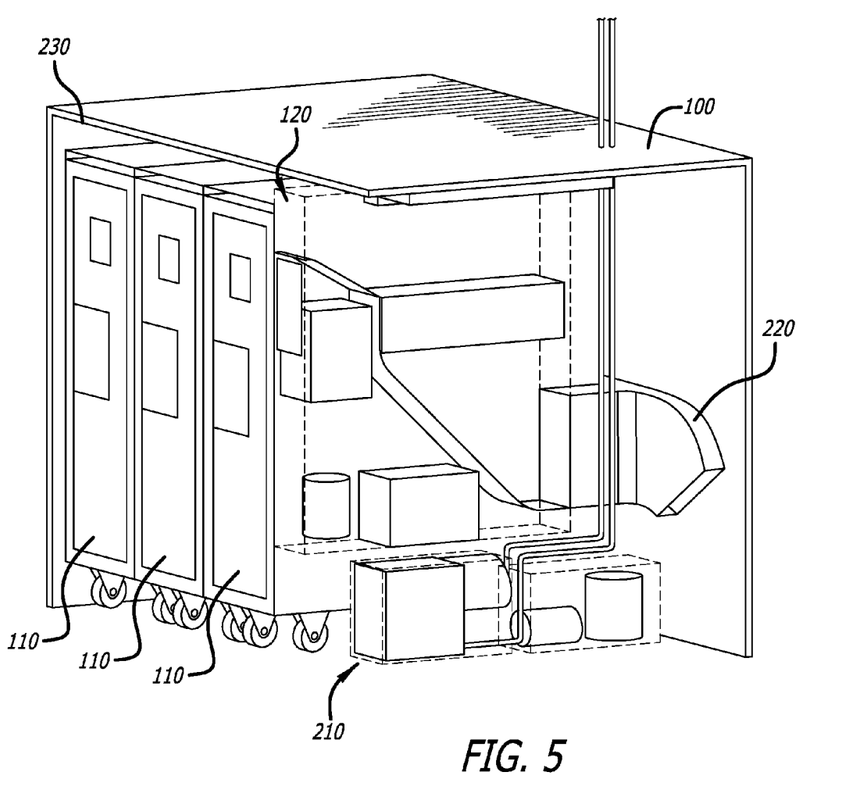
FIG. 5 is an elevated perspective view of the chiller unit and liquid cooling unit with supply air ducting.

FIG. 5 illustrates how the components of the chiller system is arranged in an aircraft galley beverage cart compartment 100. The chiller 120 can be mounted to the ceiling of the compartment 100, with a supply air duct 220 disposed rearward to deliver chilled air to the compartment away from the entrance 230 to the compartment. The liquid cooling unit 210 is located adjacent to or immediately below the chiller 120, and has approximately the same width as the chiller. Thus, space is conserved and efficiency is promoted by incorporating the entire system (save the ducting to carry away the warm air) and the heat exchanger 80*a* to remove heat from the warm coolant. Note from FIG. 5 that the cooling system is no larger than and takes up no more space than a beverage cart 110, and is approximately half the width.

Figure 6:
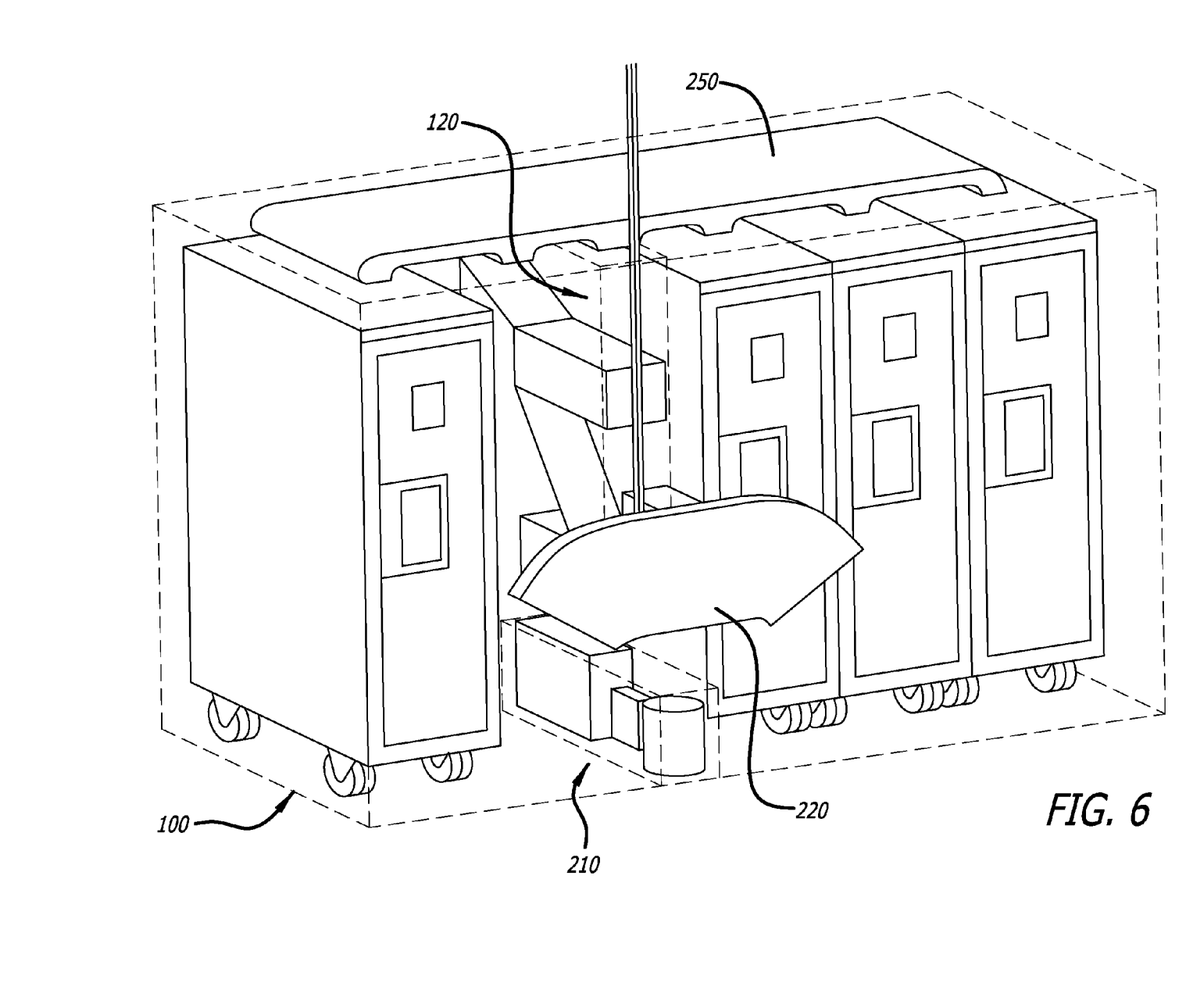
FIG. 6 is a perspective, rear view of the galley cart compartment and the chiller/liquid cooling unit with supply ducting.
Figure 7:
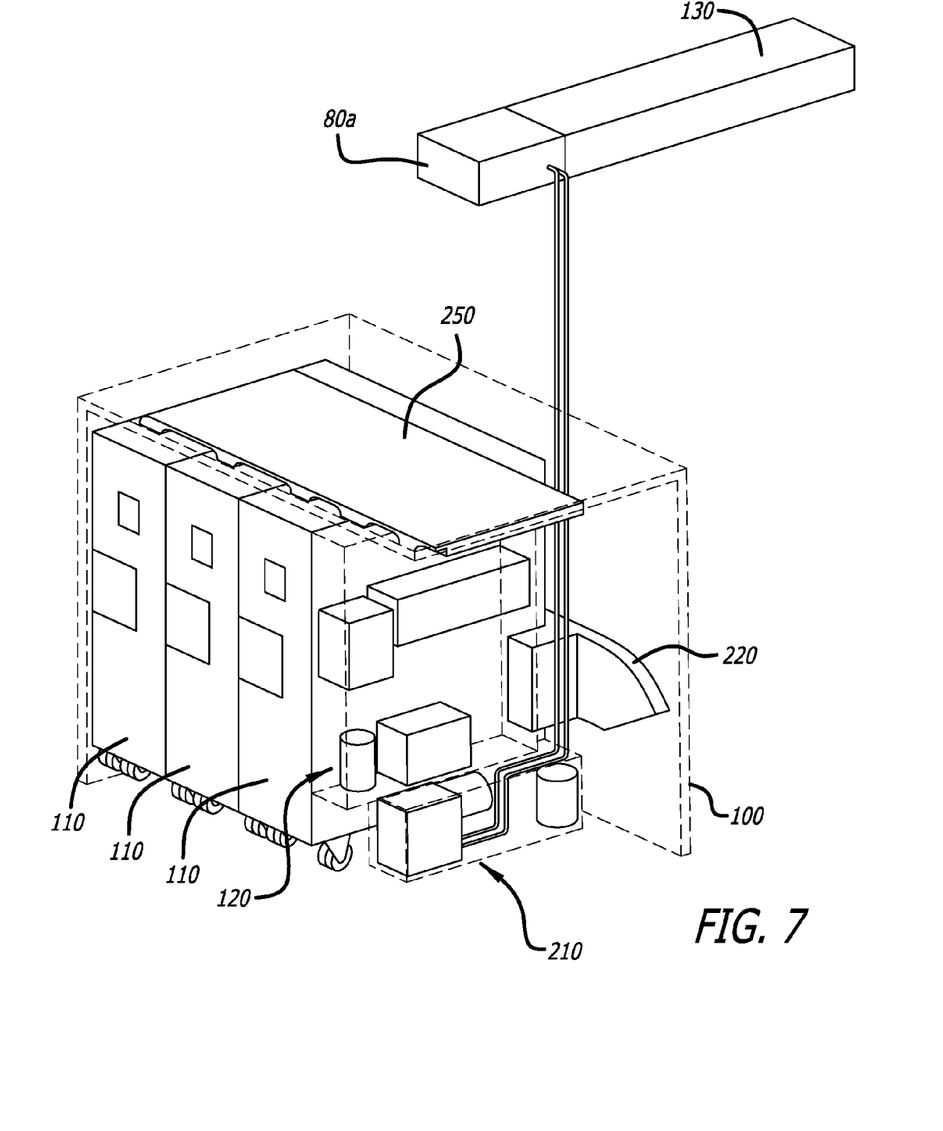
FIG. 7 is a another elevated perspective view of the galley cart compartment and the chiller/liquid cooling unit with supply ducting and return ducting.

FIG. 6 shows the rear of the galley cart compartment 100 (with the chiller system in phantom) illustrating the supply ducting 220 to distribute chilled air to the compartment 100 along the rear wall. Also shown is return ducting 250 that draws air from the compartment. The return ducting brings air from the galley into the system, where it is chilled and distributed to the carts as shown. This can also be seen in FIG. 7, where the overhead ducting and heat exchanger is shown to remove the heat from the warm coolant and reject the warm air to the aircraft. The warm air may be used to recover some of the heat therefrom.

The present invention serves to demonstrate an inside-the-compartment, or POU, chiller system for a beverage cart compartment of an aircraft galley. The system is effective at removal of condensate from the evaporator, and improves the overall heat transfer efficiency of the evaporator and the system in general.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

We claim:

1. A temperature controlling system for an aircraft galley, comprising:
   (a) a galley housing for containing a plurality of galley carts in a side-by-side array and movable between a stowed position in the galley housing and a deployed position exterior to the galley housing;
   (b) a refrigeration bay positioned in the housing and extending from a forward position to a rearward position in the housing in an area of the galley housing between adjacent galleys when in the stowed position; and
   (c) a vapor cycle refrigeration system including a compressor, a heat exchanger, an expansion valve, an evaporator, and a liquid-cooled condenser positioned in the refrigeration system bay and extending in the refrigeration bay from the forward position to the rearward position in the galley housing.

2. The temperature controlling system of claim 1, further comprising a distribution vent on a rear surface of the vapor cycle refrigeration system for distributing chilled air to a back portion of the galley housing.

3. The temperature controlling system of claim 1, and further including a return duct positioned below an upper surface of the refrigeration bay for returning air to the refrigeration system from the aircraft galley.

4. The temperature controlling system of claim 1, and including a fan positioned in the refrigeration bay in proximity with the heat exchanger.

5. The temperature controlling system of claim 1, wherein the vapor cycle refrigeration system includes an electronic controller including a user interface for monitoring and controlling the operation of the system.

6. The temperature controlling system of claim 1, wherein the vapor cycle refrigeration system includes a plurality of fans for drawing air over an evaporator.

7. A temperature controlling system for an aircraft galley, comprising:
   (a) a galley housing for containing a plurality of galley carts in a side-by-side array and movable between a stowed position in the galley housing and a deployed position exterior to the galley housing;
   (b) a refrigeration bay positioned in the housing and extending from a forward position to a rearward position in the housing in an area of the galley housing between adjacent galleys when in the stowed position;
   (c) a vapor cycle refrigeration system including a compressor, a heat exchanger, an expansion valve, an evaporator, and a liquid-cooled condenser positioned in the refrigeration system bay and extending in the refrigeration bay from the forward position to the rearward position in the galley housing;
   (d) a distribution vent on a rear surface of the vapor cycle refrigeration system for distributing chilled air to a back portion of the galley housing;
   (e) a return duct positioned below an upper surface of the refrigeration bay for returning air to the refrigeration system from the aircraft galley; and
   (f) a fan positioned in the refrigeration bay in proximity with the heat exchanger for circulating air within the galley housing.

* * * * *